(12) United States Patent
Farres et al.

(10) Patent No.: US 11,332,110 B2
(45) Date of Patent: May 17, 2022

(54) UTILIZING A PARK BRAKE SYSTEM TO IMPROVE THE DECELERATION OF A VEHICLE IN THE EVENT OF FAILURE OF THE SERVICE BRAKE SYSTEM

(71) Applicant: Volvo Lastvagnar AB, Gothenburg (SE)

(72) Inventors: Lionel Farres, Heyrieux (FR); Anders Vikstrom, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 78 days.

(21) Appl. No.: 16/631,293

(22) PCT Filed: Jul. 20, 2017

(86) PCT No.: PCT/EP2017/068394
§ 371 (c)(1),
(2) Date: Jan. 15, 2020

(87) PCT Pub. No.: WO2019/015762
PCT Pub. Date: Jan. 24, 2019

(65) Prior Publication Data
US 2020/0207317 A1    Jul. 2, 2020

(51) Int. Cl.
*B60T 13/66* (2006.01)
*B60T 8/92* (2006.01)
*B60T 8/171* (2006.01)
*B60T 8/88* (2006.01)
*B60T 17/18* (2006.01)
(Continued)

(52) U.S. Cl.
CPC ............... *B60T 8/92* (2013.01); *B60T 8/171* (2013.01); *B60T 8/885* (2013.01); *B60T 17/18* (2013.01);
(Continued)

(58) Field of Classification Search
CPC .......... B60T 8/88; B60T 8/323; B60T 8/1708; B60T 8/1705; B60T 8/885; B60T 8/92;
(Continued)

(56) References Cited

U.S. PATENT DOCUMENTS 6,105,705 A * 8/2000 Faye ..................... B60T 7/12
                                                   180/275
6,752,472 B2 * 6/2004 Bezzina ............... B60T 13/261
                                                   303/20
(Continued)

FOREIGN PATENT DOCUMENTS

EP          2108554 A1      10/2009
WO     WO-2016000730 A1 *   1/2016 ............ B60T 13/683
WO     WO-2017017490 A1 *   2/2017 ............. B60T 8/172

OTHER PUBLICATIONS

International Search Report and Written Opinion for International Patent Application No. PCT/EP2017/068394, dated Mar. 28, 2018, 11 pages.

*Primary Examiner* — Robert A. Siconolfi
*Assistant Examiner* — Stephen M Bowes
(74) *Attorney, Agent, or Firm* — Withrow & Terranova, PLLC (57) ABSTRACT

The invention concerns a method for utilizing a park brake system to improve the deceleration of a vehicle in the event of failure of the service brake system, the service brake system comprising a brake pedal (2) and at least one air supply circuit (40, 42, 44), the method including the steps of a) measuring the pressure in the air supply circuit, in particular in an air tank (40, 42) of the air supply circuit, and b) when the pressure in the air supply circuit falls below a certain value, switching the park brake system from a normal mode, wherein the park brake system is released, to an assistance mode. In the assistance mode, the park brake system assists the service brake system only if the brake (Continued)

pedal (2) is depressed until reaching a threshold position different from a rest position.

13 Claims, 5 Drawing Sheets

(51) Int. Cl.
*B60T 7/12* (2006.01)
*B60T 8/58* (2006.01)

(52) U.S. Cl.
CPC . *B60T 7/12* (2013.01); *B60T 8/58* (2013.01); *B60T 2270/402* (2013.01)

(58) Field of Classification Search
CPC .. B60T 8/327; B60T 2270/40; B60T 2230/00; B60T 17/18; B60T 17/22; B60T 17/221; B60T 13/385; B60T 13/68; B60T 13/683
See application file for complete search history.

(56) References Cited

U.S. PATENT DOCUMENTS

| | | |
|---|---|---|
| 2004/0046443 A1 | 3/2004 | Jensen et al. |
| 2004/0108769 A1* | 6/2004 | Marathe ............. B60T 7/12 303/2 |
| 2005/0125132 A1* | 6/2005 | Stumpp ............. B60T 13/14 701/70 |
| 2007/0298930 A1 | 12/2007 | Hofler et al. |
| 2008/0067862 A1* | 3/2008 | Parrott ............. B60T 8/327 303/7 |
| 2008/0149437 A1* | 6/2008 | Herges ............. B60T 7/122 188/138 |
| 2008/0309154 A1* | 12/2008 | Hilberer ............. B60T 7/107 303/15 |
| 2009/0256416 A1* | 10/2009 | Bensch ............. B60T 17/22 303/17 |
| 2009/0280959 A1* | 11/2009 | Bensch ............. B60T 17/083 477/198 |
| 2010/0025141 A1* | 2/2010 | Bensch ............. B60T 8/327 180/271 |
| 2011/0005874 A1* | 1/2011 | Beier ............. B60T 13/26 188/106 F |
| 2014/0015310 A1* | 1/2014 | Hanzawa ............. B60T 17/22 303/3 |
| 2014/0054118 A1 | 2/2014 | Rogers et al. |
| 2017/0113670 A1* | 4/2017 | Farres ............. B60T 17/221 |
| 2018/0229705 A1* | 8/2018 | Farres ............. B60T 13/741 |

* cited by examiner

UTILIZING A PARK BRAKE SYSTEM TO IMPROVE THE DECELERATION OF A VEHICLE IN THE EVENT OF FAILURE OF THE SERVICE BRAKE SYSTEM

This application is a 35 USC 371 national phase filing of International Application No. PCT/EP2017/068394, filed Jul. 20, 2017, the disclosure of which is incorporated herein by reference in its entirety.

The present invention concerns a method for utilizing a park brake system to improve the deceleration of a vehicle in the event of failure of the service brake system.

In a well-known manner, a vehicle includes a park brake system and a service brake system. The service brake system comprising a brake pedal and at least one air supply circuit. The park brake system and the service brake system include common actuators for each wheel. Typically, each one of these actuators includes a cylinder inside which are arranged two compartments, namely a compartment for the application of the parking brake and a compartment for the application of the service brake. The compartment for the application of the parking brake includes a loaded spring and a pressurized chamber, the loaded spring being capable of providing an axial braking force when the pressurized chamber is vented. The compartment for the application of the service brake includes a diaphragm and a pressurized chamber, the diaphragm being capable of providing an axial braking force when the chamber is pressurized. The diaphragm and the spring act on the same piston rod.

The parking brake system and the service brake system are pneumatically powered and there is at least one air supply circuit for each system. Typically, each air supply circuit of the service brake system includes an air tank for the front axle(s) and another air tank for the rear axle(s). A compressor supplies all of the air supply circuits of the vehicle and valves protect each air supply circuit of the vehicle from an air leak in another air supply circuit.

In the automotive industry, the actual braking homologation requires that in case of single failure in the service brake system, a minimum rate of braking still needs to be achieved, the stopping distance and deceleration are representative parameters of this rate of braking. The idea is to use the park brake system to assist the service brake system and improve the secondary and/or residual braking performance in the event of failure of the service brake system.

Typically, the weight of a tractor vehicle is not evenly distributed because most of the load is supported by the front axle. Therefore, the brakes of the front axle wheels are more efficient than the brakes of the rear axle wheels. Accordingly, the rate of braking (stopping distance and deceleration) highly decreases when a leak occurs in one air supply circuit of service brakes, i.e. when the service brakes of the front axle wheels become ineffective. The assistance of the parking brake system helps then improving the rate of braking.

US 2011/0005874 A1 discloses a method wherein, in the event of failure of one or more of the service brake circuits, the vehicle can still be braked by means of the parking brake device. The parking brake device therefore constitutes an auxiliary braking function for the service brake. When a failure of the service brake is detected, the parking brake device is automatically applied or an alarm signal is output so that the driver can brake the vehicle using an electrical activation device for activating the parking brake or the brake pedal.

US 2014/0054118 A1 discloses a method according to the preamble of claim 1. In particular, such method includes a first step consisting in determining whether service brake pressure is below a predetermined amount of pressure, a second step consisting in determining whether the brake pedal is depressed and a third step consisting in applying the parking brake as auxiliary brake if both conditions are met.

In the event of failure of the service brake system, the parking brake is then applied as soon as the driver depresses the brake pedal. The parking brake is deactivated when the driver releases the brake pedal. One imagines that when the parking brake is repeatedly used as auxiliary braking, a high quantity of compressed air is consumed because the parking brake system consumes a higher quantity of compressed air than the service brake system. Also, the application of the parking brake with maximum effort while the vehicle is moving, for example on a highway, may lead to a very dangerous situation.

US 2009/0280959 A1 discloses a method for controlling a vehicle brake system comprising steps consisting in, first, measuring the pressure inside a first reservoir among the reservoirs dedicated to the service brake system, second, in comparing the measured reservoir pressure with a predetermined minimum pressure value and in, third, venting the spring-actuator part of a combination spring-actuated/diaphragm cylinder so as to automatically engage the parking brake. Accordingly, not all service brake failures are considered, meaning that there are configurations wherein no assistance is provided despite the existence of a service brake failure. In addition, the assistance is automatically triggered, i.e. without any human action, which may be dangerous and surprise the driver given that the driver did not necessarily want to slow down the vehicle (ex: vehicle moving on a highway).

WO 2006/053630 A1 discloses a motor vehicle wherein the parking brake may be operated as an auxiliary for the main brake (service brake) and as a sustained-action brake, for example during long downhill drives. The parking brake may be used as an aid for reversing drive when the driving direction is changed, for example in the case of shovel dozer which changes its driving direction frequently. WO 2006/053630 A1 does not tackle the problem of the application of a park brake system in the event of failure of the service brake system.

DE10339245 A1 discloses a method of controlling an engagement of a vehicle parking brake so as to avoid damage of the parking brake. In particular, the service brake is applied instead of the parking brake when the vehicle speed is outside a preferred speed range. Thus, DE10339245 A1 does not tackle the problem of the application of a park brake system in the event of failure of the service brake system.

The aim of the present invention is to propose a method that remedies the abovementioned drawbacks.

To this end, the invention concerns a method.

Thanks to the invention, the parking brake system does not assist the service brake system if the pedal brake does not reach the threshold position, i.e. if the driver does not depress the pedal brake enough. The parking brake assistance is then triggered only in emergency situations, wherein the driver requires strong braking and wherein such braking cannot be performed efficiently in the event of failure of the service brake system. Even in case of a failure, the service brake system always provides a minimum braking torque, which enables in most of the cases to slow down and stop the vehicle. The idea is then to use as much as possible the service brake system and to use the parking brake assistance only in absolute necessity, such as emergency braking. This allows saving pneumatic energy since the parking brake system consumes more energy than the service brake system.

Further advantageous features of the method are specified in the dependent claims.

The invention also concerns a vehicle.

Figure 1:
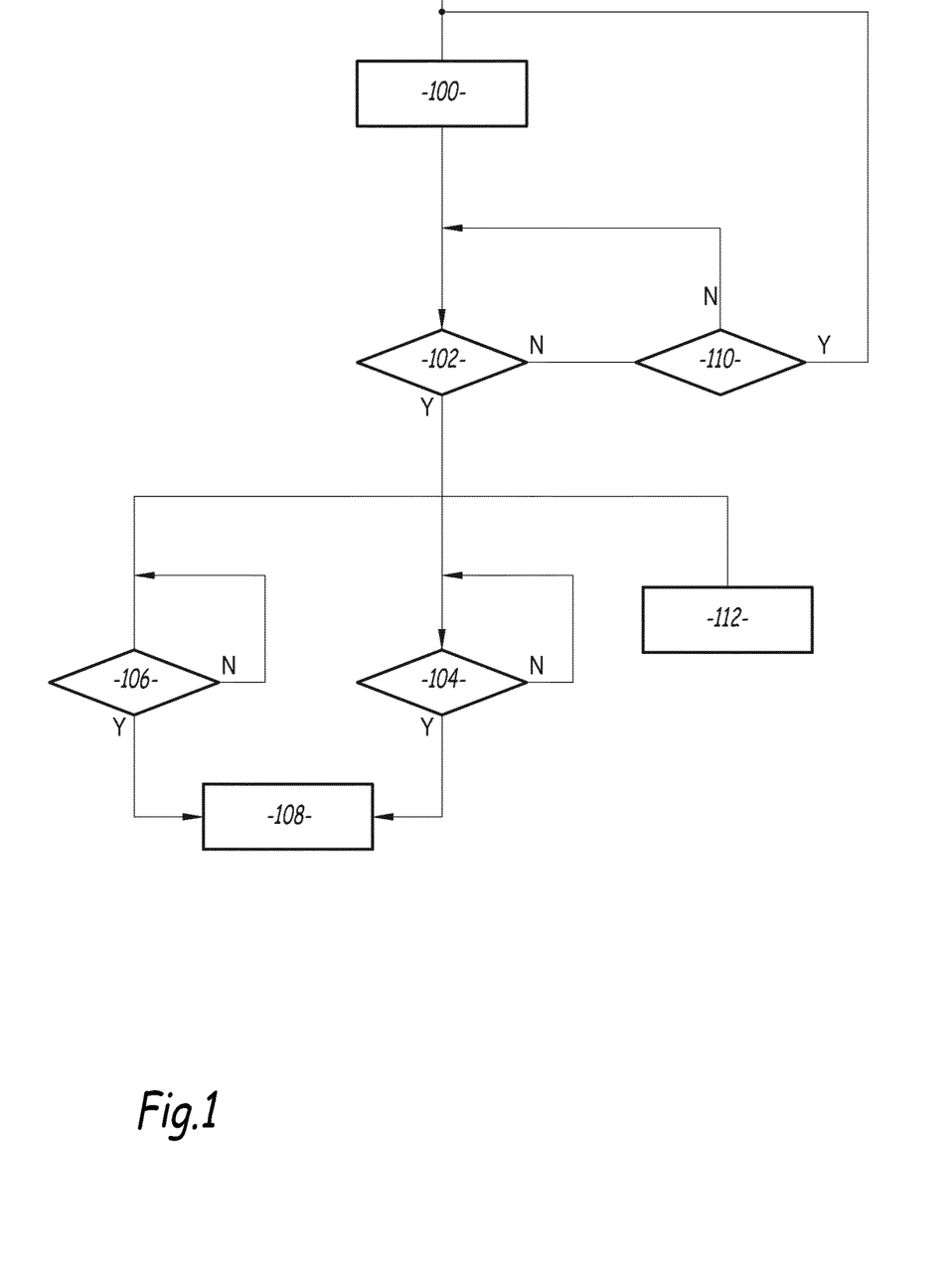
FIG. 1 is a flow chart representing the steps of the method according to the invention.
Figure 2:
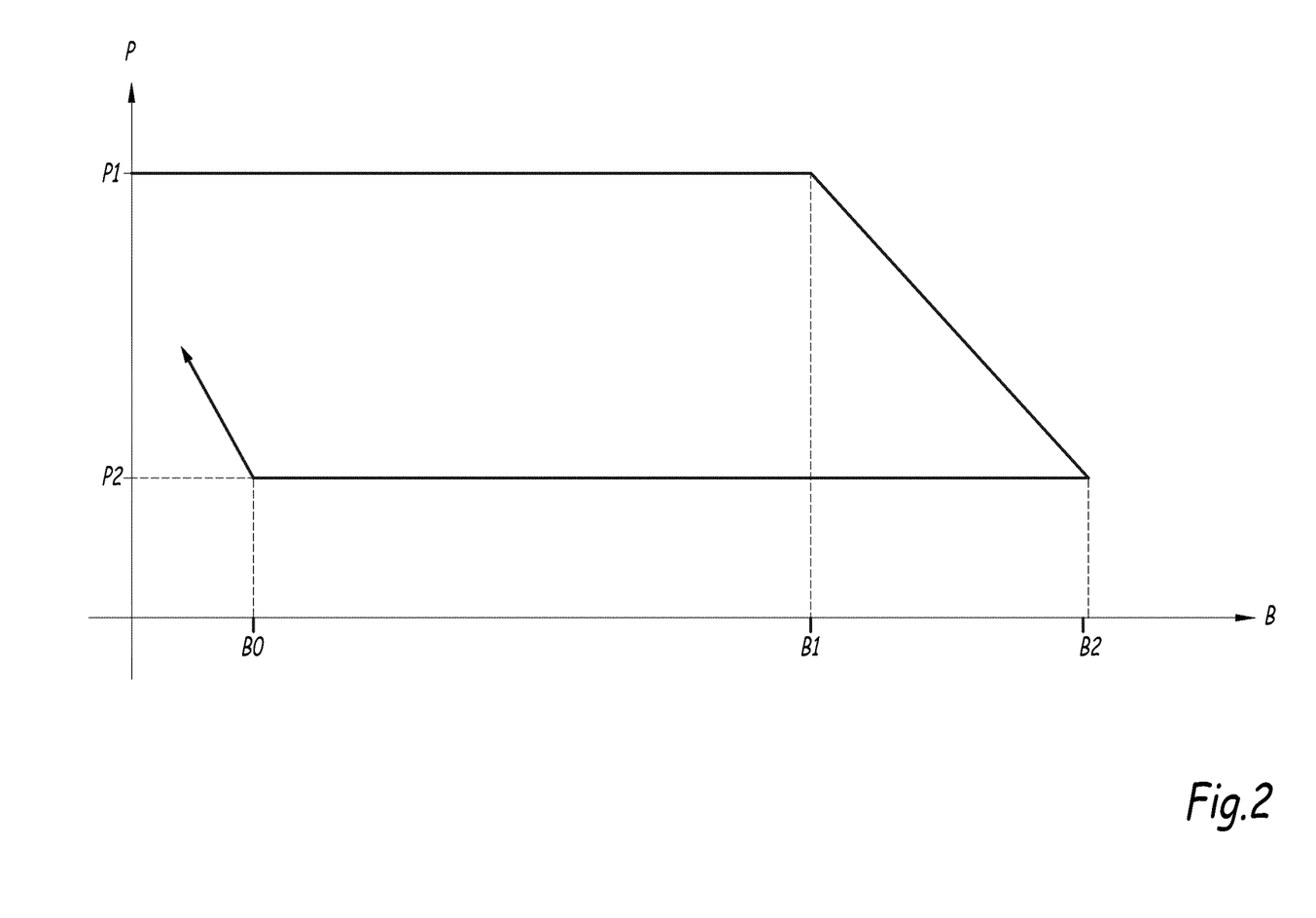
FIG. 2 is a graph showing the evolution of the pressure in a parking brake cylinder in function of the brake pedal stroke, in the event of failure of the service brake system.
Figure 3:
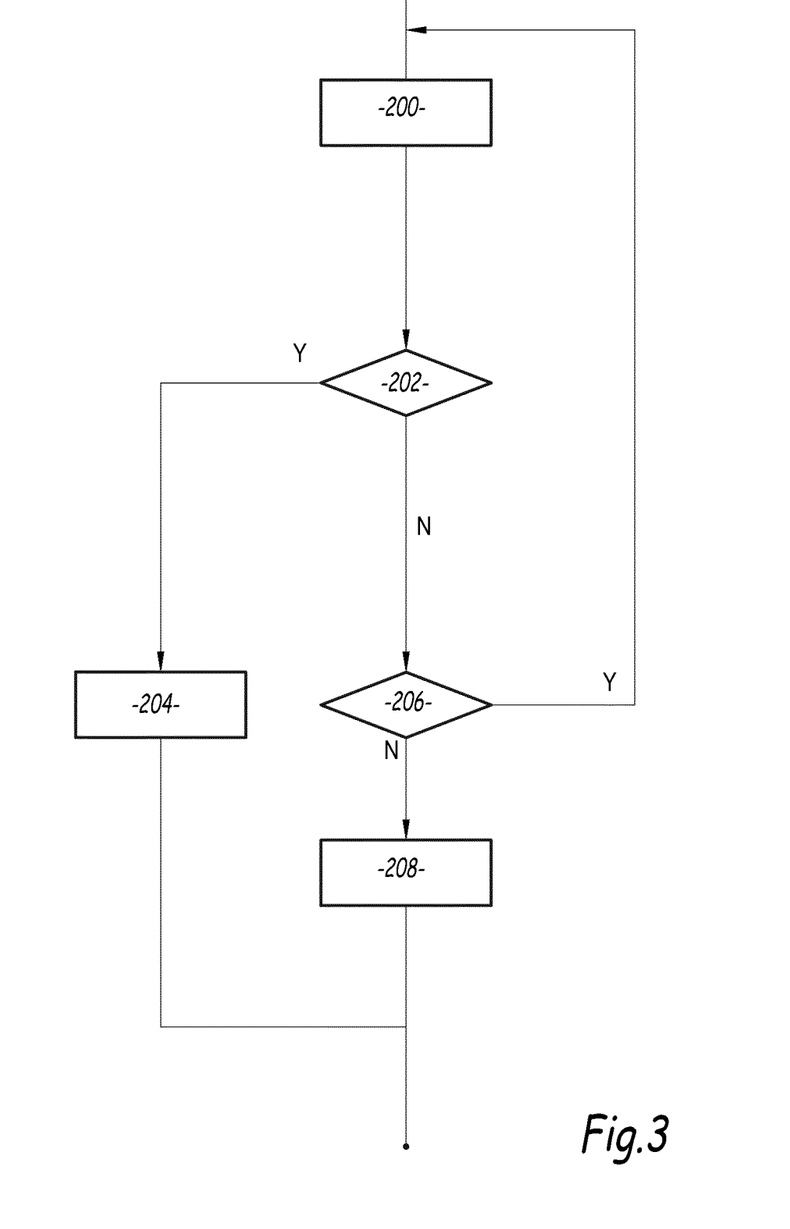
FIG. 3 is a flow chart representing additional aspects of the method.

The invention will be better understood from reading the following description, given solely by way of two non-limiting examples and with reference to the appended drawings, which are schematic descriptions, in which:

FIGS. 1 to 3 represent a method for utilizing a park brake system to improve the deceleration of a vehicle 1 in the event of failure of the service brake system.

Figure 4:
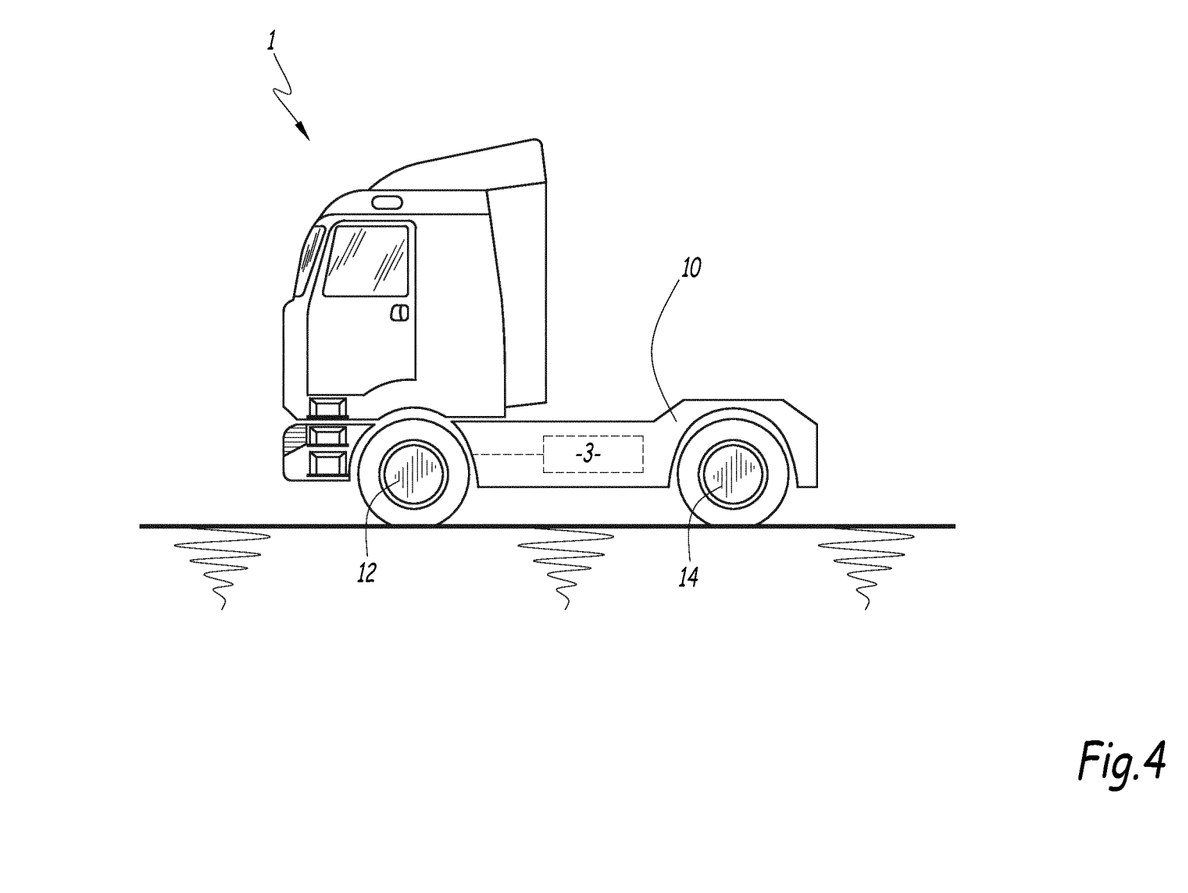
FIG. 4 shows a vehicle according to the invention, with which the method can be implemented.

The vehicle 1 is represented on FIG. 4. In the example, the vehicle 1 is a lorry comprising a chassis 10, a front axle 12 and a rear axle 14. In the example, the vehicle 1 is a 4*2 vehicle, i.e. a four-wheels vehicle that transmits engine torque to only two axle-ends: the front two in front-wheel drive or the rear two in rear-wheel drive. Alternatively, the vehicle may be a 6*4 vehicle, a 6*2 vehicle, a 4*4 vehicle, etc.

The vehicle 1 also includes a brake system 3 comprising a park brake system, typically an electromechanical park brake system (EPB system), and a service brake system, providing at least an ABS function.

Figure 5:
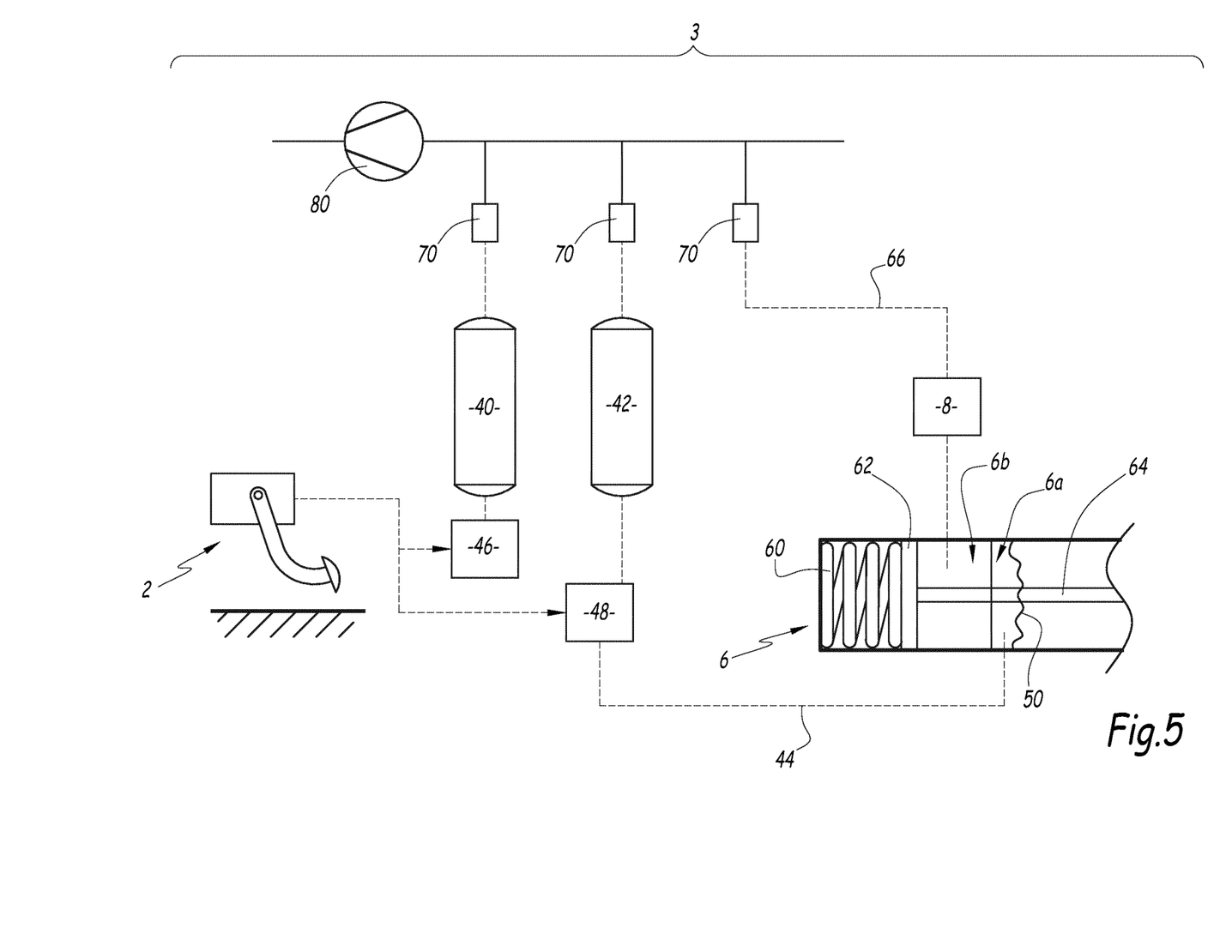
FIG. 5 represents schematically a parking brake system and a service brake system of a vehicle according to the invention.

The brake system 3 is represented in more detail on FIG. 5. As shown on this FIG. 5, the service brake system comprises a brake pedal 2 and at least one, preferably two air supply circuits. The air supply circuits enable feeding wheel brakes (not represented) with compressed air so as to exert a braking torque on the vehicle wheels.

In the example, the wheels of each axle 12 and 14 of the vehicle 1 are equipped with a respective wheel brake.

Each air supply circuit of the service brake system comprises an air tank, respectively 40 or 42. Tank 40 is dedicated to the wheel brakes of an axle or a group of axles, typically front axle(s) wheels, and tank 42 is dedicated to the wheel brakes of an axle or a group of axles, typically rear axle(s) wheels.

The wheel brakes are provided with respective brake cylinders 6, whose only one of them is represented on FIG. 5. Each one of the brake cylinders 6 is designed as a combination spring-actuated element/diaphragm cylinder. Each brake cylinder 6 therefore has a spring-actuator part which is a parking brake component and a diaphragm part which is a service brake component.

Each air supply circuit of the service brake system enables supplying a first chamber 6a via line 44 of one of more dedicated brake cylinders 6. Typically, each air supply circuit includes a control box, respectively 46 or 48, for controlling the pressure level in the chamber 6a. Each control box is an electro-pneumatic control box, including an ECU and a valve. The control boxes 46 and 48 are each connected to a sensor (not represented) measuring any movement of the brake pedal 2. In the example of FIG. 5, the represented brake cylinder 6 is supplied by the air tank 42, under control of control box 48. For the purpose of clarity, the other brake cylinder(s) supplied by the air tank 42 and the brake cylinders supplied by the air tank 40 are not represented on the figure.

The diaphragm part includes a diaphragm 50 that deforms when the first chamber 6a is pressurized with compressed air. The diaphragm 50 is connected to a piston rod 64 so that the piston rod moves in translation when the diaphragm 50 deforms.

The spring-actuator part includes a spring 60 that loads elastically a piston 62. The piston 62 is movable inside the cylinder and is able to push the piston rod 64. The spring-actuator part comprises a second chamber 6b counterbalancing the spring effort. The parking brake system has its own air supply circuit, which is represented by a compressed air line 66 on FIG. 5. When the chamber 6b is vented, the piston rod 62 is pushed by the spring 60 and the parking brake system is engaged.

In the example, the parking brake system operates on the front and rear wheels of the vehicle 1, i.e. on the wheels of the front axle 12 and on the wheels of the rear axle 14. However, in a non-represented alternative embodiment, the parking brake system operates only on the rear wheels of the vehicle. Such arrangement depends on the relevant laws and regulations with this respect. For example, in the United-States, the application of the parking brake on the wheels of the front axle(s) is not necessary.

Each air supply circuit is protected with a valve 70 that protects the air supply circuit from any air leakage occurring in another air supply circuit. Accordingly, when an air leak occurs in one of the air supply circuits, the other air supply circuits are not impacted, or at least the impact is limited. The valves 70 can also be referred to as "overflow valves".

A compressor 80 provides each air supply circuit with compressed air. The compressor 80 is designed for compressing air extracted from the atmosphere. It is generally indirectly driven by the thermal engine (not represented) of the vehicle 1.

The structures of the service brake system and of the parking brake system are well known, that is why the parking brake system and the service brake system are not described in more detail.

The method includes a first step a) consisting in measuring the pressure in each air supply circuit of the service brake system, in particular in an air tank 40 or 42. In practice, the vehicle 1 includes a measuring means (not represented) for measuring the pressure in the air tank 40 and another measuring means (not represented) for measuring the pressure in the air tank 42. Any pressure sensor may be used as measuring means.

The method includes a second step b) consisting, when the pressure in the air supply circuit falls below a certain value, in switching the park brake system from a normal mode, wherein the park brake system is released, to an assistance mode. This assistance mode can also be referred to as a "parking brake blending function".

Typically, the certain value corresponds approximately to the half of the normal pressure inside the air tank 40 or 42. In particular, the pressure inside the air tank 40 or 42 is between 10 and 12 bar, meaning that the certain value may be of 6.5 bar. In other words, when the pressure in the air supply circuit in particular in the air tank 40 or 42, falls below 6.5 bar, it is considered that there is a failure in the service brake system, such as an air leak.

In practice, the vehicle 1 comprises a control unit 8 for switching the park brake system from the normal mode to the assistance mode when the pressure in the air supply circuit, preferably in one of the supply circuits, falls below the certain value. Typically, the control unit 8 is of the electro-pneumatic type. It includes an ECU and a valve. The control unit 8 controls the application of the park brake system depending on the actuation of a park brake input device (not represented), such as a hand lever, which is different from the brake pedal 2. The park brake input device may also be referred to as a hand control unit (HCU). The EPB systems are well known in the automotive industry, that is why the EPB system is not further described.

On FIG. 1, box 100 illustrates that low pressure conditions are detected, i.e. that the pressure in the air supply circuit of the service brake system, preferably in one of the supply circuits, has fallen below the certain value.

In the meaning of the present document, in the "assistance mode", the park brake system may assist the service brake system, but only under specific conditions. This means that the park brake system does not assist the service brake system if such specific conditions are not met (necessary conditions). This also means that, in the assistance mode, the park brake system does not always assist the service brake system.

In the assistance mode, the park brake system assists the service brake system only if the brake pedal 2 is depressed until reaching a threshold position B1. Therefore, the method includes a step 102 consisting in checking whether the brake pedal 2 is depressed until reaching the threshold position B1.

By the expression "only if", it is meant that if the brake pedal 2 is not depressed or if the threshold position B1 is not reached, then the park brake system does not assist the service brake system. This is a necessary condition, not to be confused with a sufficient condition.

The threshold position B1 is different from a rest position of the pedal brake 2, meaning that the park brake system does not assist the service brake system each time the driver depresses the pedal brake 2, even if low pressure conditions are detected in one air supply circuit of the service brake system. In particular, if the pedal brake 2 is depressed until reaching a position between the rest position and the threshold position, then the park brake system does not assist the service brake system.

For example, the threshold position B1 is defined between 50% and 100%, preferably between 75% and 100% of the brake pedal stroke starting from the rest position. Therefore, the driver has to press the brake pedal 2 almost down fully or down fully to activate the assistance. The assistance is then triggered only in emergency situations, wherein the driver requires strong braking and wherein such strong braking cannot be performed efficiently in the event of failure of the service brake system.

In the assistance mode, and as shown on FIG. 2, the pressure P inside the pressurized chamber 6b is inversely proportional to the displacement of the brake pedal 2 beyond the threshold position B1. This means that the braking effort will be as high as the brake pedal stroke when the brake pedal is depressed. The driver then has the possibility of controlling the braking effort that is applied by the park brake system. In other words, in the assistance mode, the park brake system is controlled substantially in the same manner as the service brake system. This also means that if the driver does not press the brake pedal 2 beyond the threshold position B1, then the pressure P inside the pressurized chamber 6b is not decreased and the parking brake system does not assist the service brake system.

When the brake pedal 2 is down fully depressed, the pressure inside chamber 6b is proportionally decreased until reaching a threshold pressure P2, which is in the example different from 0 bar. This means that, in the assistance mode, the park brake system could not be fully applied. Typically, the threshold pressure P2 is between 2 and 5 bar. This is particularly advantageous because the park brake system is not designed for slowing down a vehicle but for holding the vehicle stationary on an up or down gradient. Accordingly, the maximum braking effort of the park brake system can be higher than that of the service brake system in case of leakage in the service brake system and fully applying the park brake system while the vehicle is moving may lead to stability issues (loss of adherence).

Alternatively, the pressure P inside the pressurized chamber 6b is not inversely proportional to the displacement of the brake pedal 2 beyond the threshold position B1. In this alternative, the pressure inside chamber 6b is decreased until reaching threshold pressure P2 as soon as the threshold position B2 is reached. Accordingly, chamber 6b is vented even if the driver does not press the brake pedal 2 beyond the threshold position B1.

In another variant, in the assistance mode, the pressure inside the pressurized chamber 6b may be inversely proportional to the time period during which the brake pedal 2 is maintained beyond the threshold position B1. This means that the braking effort will be as high as the time duration during which the driver depresses the brake pedal.

Preferably, in the assistance mode, the park brake system provides a stronger braking torque to the wheels of a front axle 12 than to the wheels of a rear axle 14. Indeed, front wheels often have a better adherence to the track than rear wheels, meaning that rear wheels lose traction generally before the front wheels lose traction. This can be explained by the weight repartition of the vehicle, which is mainly on the front side in the example of a lorry. Accordingly, applying the same braking effort to the rear wheels than to the front wheels would probably lead to a loss of adherence of the rear wheels and reduce the braking efficiency. The idea is then to apply less braking effort on the rear wheels to keep the adherence to the track and optimize the braking efficiency.

The distinction between the braking effort applied on the front wheels and the braking effort applied on the rear wheels is performed by modifying the spring design of the brake cylinders 6 affected to the wheel brakes of the rear wheels. In practice, the chambers 6b of all of the respective brake cylinders 6 of the vehicle 1 are at the same pressure. Typically, when the parking brake system is released, the chambers 6b of all of the respective brake cylinders 6 of the vehicle 1 are at the pressure of 8.5 bar. Each brake cylinder 6 has a specification that is called "release pressure". The release pressure is the pressure threshold at which the park brake system becomes effective, i.e. provides the wheels with a positive braking torque. The release pressure is often below the pressure of the chamber 6b when the parking brake is released, in order to have a safety margin in case of a slight unexpected pressure drop. Typically, the release pressure depends on the spring design. It could be on the order of 6.5 bar. This means that when the pressure in the chamber 6b is between 8.5 bar and 6.5 bar, the spring 60 does not provide any axial effort to the corresponding wheel brake. However, when the pressure in the chamber 6b drops below 6.5 bar, the spring 60 provides an axial effort evolving in a manner that is inversely proportional to the pressure decrease.

Advantageously, and as mentioned above, the spring design of the brake cylinders 6 affected to the front wheels is different from that of the brake cylinders 6 affected to the rear wheels, meaning that the release pressure of the brake cylinders 6 affected to the front wheels is different from that of the brake cylinders 6 affected to the rear wheels. Typically; the release pressure of the brake cylinders 6 affected to the front wheels may be of 6.5 bar, while the release pressure of the brake cylinders 6 affected to the rear wheels may be of 5.5 bar.

In the example, the park brake system is switched from the assistance mode to the normal mode when the brake pedal 2 is released until reaching another threshold position B0. In particular, this other threshold position B0 is defined between 0% and 25% of the brake pedal stroke starting from rest position. This means that the assistance is deactivated only when the driver has completely or almost completely released the brake pedal 2, i.e. when there is no more danger.

Therefore, the method includes a step 104 consisting in checking whether the brake pedal 2 is released until reaching the other threshold position B0.

When the park brake system is switched back into normal mode, the chamber 6a is pressurized with compressed air, meaning that the spring 60 is compressed and that no more axial braking force is exerted. Typically, the pressure inside chamber 6a is increased up to the maximum pressure P1 which is about 8.5 bar. At this pressure level, the parking brake system is completely released.

On FIG. 1, box 108 illustrates that, at this stage, the park brake system is released by building up the pressure inside chamber 6b up to maximum pressure.

Advantageously, the vehicle 1 includes an antilock braking system.

Preferably, in the assistance mode, the park brake system assists the service brake system only under certain conditions related to the status of the antilock braking system. Antilock braking systems are part of common knowledge that is why there is no detailed description thereupon. Typically, an antilock braking system includes wheel speed sensors capable of detecting wheel blocking. The antilock braking system is considered to be active, i.e. in an activated status, in relation to a corresponding wheel when the braking effort is such that the relative speed of rotation of said corresponding wheel has tendency to decrease to zero or close to zero faster than a referenced wheel rotation speed. In known manner, ABS is typically considered as active when either wheel slip exceeds a certain threshold or when wheel deceleration exceeds a certain threshold.

Therefore, the method includes preferably a step 106 consisting in determining whether the antilock braking system is active.

In particular, the certain conditions includes the condition according to which the status of the antilock braking system is not active for a wheel of a spring braked axle, meaning that, in the assistance mode, the park brake system assists the service brake system only when the status of the antilock braking system is not active for a wheel of a spring braked axle. A spring braked axle is an axle wherein the two end wheels are provided with corresponding spring brake cylinders 6.

However, the status of the antilock braking system of the wheels of the axle(s) that are not spring braked, i.e. that are not assisted by park brake, is preferably not part of the certain conditions, meaning that, in the assistance mode, the park brake system assists the service brake system even when the status of the antilock braking system is active as long as there is no assistance being applied to the wheels of such axle(s). Advantageously, the park brake system includes a park brake input device (not represented), such as a hand lever, different from the brake pedal 2. The park brake input device may also be referred to as a hand control unit (HCU). In this configuration, priority is given to the manual operation of the park brake system, meaning that the park brake system is switched from the assistance mode to the normal mode when the park brake input device is operated.

On FIG. 3, box 200 illustrates that the park brake system is in assistance mode. Then, it is determined at a step 202 whether park brake activation is requested by the driver, i.e. whether the driver operates the park brake input device with the intention of applying the park brake system. If such is the case, then the park brake system is switched from the assistance mode to the normal mode, as represented by box 204. This means that the assistance is interrupted. Advantageously, the braking effort provided by the parking brake system may be proportional to the position of the park brake input device. One speaks of a park brake system with a proportional mode.

Accordingly, all parking brake requests from driver (through the hand control unit) have priority over the parking brake blending function (assistance), excepted for the case when the HCU is maneuvered in a released way.

Optionally, the parking brake is automatically released when the vehicle speed falls below a defined threshold, such as 10 km/h. Accordingly, it is determined at a step 206 whether the vehicle speed is above the defined threshold. If such is the case, then the parking brake system is maintained in the assistance mode. However, the parking brake system is automatically switched back into normal mode when the vehicle speed falls below the defined threshold, as represented by box 208 on FIG. 3.

Notwithstanding the preceding, in a particular embodiment, the aspect of the invention related to the detection of a threshold position B1 to activate the assistance may be optional.

In this embodiment, the invention relates to a method for utilizing a park brake system to improve the deceleration of a vehicle in the event of failure of the service brake system, the service brake system comprising a brake pedal 2 and at least one air supply circuit, the method including steps consisting in:
   a) measuring the pressure in the air supply circuit, in particular in an air tank 40 or 42 of the air supply circuit,
   b) when the pressure in the air supply circuit falls below a certain value, in switching the park brake system from a normal mode, wherein the park brake system is released, to an assistance mode.

The method is specific in that the vehicle 1 includes an antilock braking system (not represented) and in that, in the assistance mode, the park brake system assists the service brake system only under certain conditions related to the status of the antilock braking system.

Typically, an antilock braking system includes wheel speed sensors capable of measuring changes in wheels speed.

In particular, the certain conditions includes the condition according to which the status of the antilock braking system is not active for a wheel of an axle assisted by park brake, meaning that, in the assistance mode, the park brake system assists the service brake system only when the status of the antilock braking system is not active for a wheel of a front axle.

The main goal is to not lock the wheels because of parking brake assistance. Parking brake blending function (assistance) guarantees performance capability on high adherence conditions. However, on low adherence conditions (ABS activity), the parking brake blending function is aborted or not activated in order to ensure that stability is kept. The objective is to have maximum braking performance without affecting the vehicle stability.

Advantageously, when the vehicle is a 4*2 vehicle, there is no spring brake force applied on the rear axle wheels. Accordingly, the status of the antilock braking system in relation to the wheels of the rear axle14 is preferably not part of the certain conditions, meaning that, in the assistance mode, the park brake system assists the service brake system even when the status of the antilock braking system is active for a wheel of a rear axle. Therefore, ABS activity is considered only in what concerns the front wheels of the vehicle, for which assistance may be active.

In another example, which is the example of a 6*4 vehicle with spring brakes only on the front axle and on the first rear axle, there is no need to monitor the ABS activity of the second rear axle wheels since that axle is not spring braked, meaning that the park brake assistance cannot provoke wheel locking (ABS activity) on that axle.

Alternatively, ABS activity may be considered for each one of the wheels of the vehicle, meaning that the certain conditions related to the status of the antilock braking system include whether the antilock braking system is active for any one of the vehicle wheels, even for the wheels of the axle(s) that are not spring braked, i.e. that are not provided with a spring brake cylinder.

In this embodiment, the vehicle 1 comprises a park brake system, a service brake system, the service brake system comprising a brake pedal 2 and at least one, preferably two air supply circuits, means for measuring the pressure in the air supply circuit(s), in particular in an air tank 40 or 42 of each air supply circuit, and a control unit 8 for switching the park brake system from the normal mode to the assistance mode when the pressure in the air supply circuit falls below a certain value.

This vehicle is specific in that it further includes an antilock braking system (not represented) and in that the park brake system is controlled to assist the service brake system only under certain conditions related to the status of the antilock braking system.

According to further advantageous features, taken in isolation or in combination:

In the assistance mode, the park brake system assists the service brake system only if the brake pedal 2 is depressed until reaching a threshold position B1 different from a rest position.

The threshold position B1 is defined between 50% and 100% of the brake pedal stroke starting from rest position.

The park brake system is switched from the assistance mode to the normal mode when the brake pedal is released until reaching another threshold position B0.

The other threshold position B0 is defined between 0% and 25% of the brake pedal stroke starting from rest position.

the park brake system includes a spring brake actuator 6 comprising a loaded spring 60 and a pressurized chamber 6b, the loaded spring 60 being capable of providing an axial braking force when the pressurized chamber is vented, and in that, in the assistance mode, the pressure inside the pressurized chamber is inversely proportional to the displacement B of the brake pedal beyond the threshold position B1.

In the assistance mode, the minimum pressure P2 in the pressurized chamber 6b is different from 0 bar.

The park brake system includes a park brake input device different from the brake pedal, while the park brake system is switched from the assistance mode to the normal mode when the park brake input device is operated.

The park brake system is automatically switched from the assistance mode to the normal mode when the vehicle speed falls below a certain speed.

In the assistance mode, the park brake system provides a stronger braking torque to the wheels of a front axle 12 than to the wheels of a rear axle 14. This is in particular suitable for 4*2 vehicles. However, the repartition of the braking efforts between the front axle(s) and the rear axle(s) may be different, depending on the wheel drive configuration (4*4, 6*2, 6*4, etc.).

In the depicted embodiments, the vehicle 1 includes only one front axle 12 and only one rear axle 14. However, the vehicle may alternatively include two or more rear axles and/or two or more front axles.

Obviously, the vehicle 1 may be different from a truck.

Alternatively, all of the wheels of the vehicle are not equipped with a respective wheel brake. Typically, the wheels of at least one, preferably at least two axles, are equipped with a respective wheel brake. In practice, the number of wheel brakes is determined to comply with the residual and/or secondary brake performance. Accordingly, it is not necessary that all of the wheels are equipped with a respective brake cylinder.

The invention is not limited to the described embodiments. The features of the embodiments and not-represented alternative embodiments may be combined to generate new embodiments of the invention.

The invention claimed is:

1. A method for utilizing a park brake system of a vehicle to assist in deceleration of the vehicle in an event of a pressure disorder at a service brake system of the vehicle comprising:

measuring a first pressure prevailing in an air supply circuit of the service brake system, the service brake system comprising a plurality of brake actuators, at least one of the plurality of brake actuators comprising a first pneumatic chamber and a second pneumatic chamber with a spring, the spring configured to provide an axial braking force when the second pneumatic chamber is vented, when the first pressure falls below a certain value, a control unit of the park brake system causes switching of the park brake system from a normal mode to an assistance mode, in the normal mode, the second pneumatic chamber is pressurized at least at a park brake release pressure, and the park brake system is released, and in the assistance mode, the park brake system assists the service brake system only if a brake pedal of the service brake system is depressed until reaching a first threshold position different from a rest position, the first threshold position defined between 50% and 100% of a brake pedal stroke starting from rest position, and the control unit of the park brake system controls a park brake pressure in the second pneumatic chamber at an intermediate pressure between 2 bars and 6.5 bars, wherein, when the brake pedal is released until reaching a second threshold position lower than the first threshold position, the park brake system is switched back from the assistance mode to the normal mode, including the park brake pressure being controlled to increase up to park brake release pressure.

2. The method of claim 1, wherein the second threshold position is defined between 0% and 25% of the brake pedal stroke starting from rest position.

3. The method of claim 1, wherein the vehicle includes an antilock braking system and in that, in the assistance mode, the park brake system assists the service brake system only under certain conditions related to the status of the antilock braking system.

4. The method of claim 3, wherein, in the assistance mode, the park brake system assists the service brake system only when the status of the antilock braking system is not active for a wheel of an axle where park brake assistance is active.

5. The method of claim 3, wherein the status of the antilock braking system in relation to wheels of a rear axle is not part of the certain conditions.

6. The method of claim 3, wherein the status of the antilock braking system in relation to wheels of at least one front axle and at least one rear axle is part of the certain conditions.

7. The method of claim 1, wherein in the assistance mode, the pressure inside the second chamber is controlled to be inversely proportional to the displacement of the brake pedal beyond the first threshold position.

8. The method of claim 7, wherein, in the assistance mode, a minimum pressure in the pressurized chamber is different from 0 bar.

9. The method of claim 1, wherein the park brake system is automatically switched back from the assistance mode to the normal mode when the vehicle speed falls below a certain speed.

10. The method of claim 1, wherein, in the assistance mode, the park brake system provides a stronger braking torque to wheels of a front axle than to wheels of a rear axle.

11. The method of claim 1, wherein the first pressure is a pressure prevailing at a tank in the air supply circuit of the service brake system.

12. The method of claim 1, wherein the park brake release pressure is at least 8.5 bar.

13. A vehicle, comprising:
park brake system,
a service brake system comprising:
  a plurality of brake actuators, at least one of the plurality of brake actuators comprising a first pneumatic chamber and a second pneumatic chamber with a spring, the spring being capable of providing an axial braking force when the second pneumatic chamber is vented,
  a brake pedal; and
  at least one air supply circuit,
a pressure sensor for measuring a first pressure in the air supply circuit, and
a control unit configured to switch the park brake system from a normal mode, wherein the park brake system is released, to an assistance mode when the pressure falls below a certain value,
  in the normal mode, the second pneumatic chamber is pressurized at least at a park brake release pressure, and the park brake system is released, and
  in the assistance mode,
    the park brake system is configured to be controlled to assist the service brake system only if the brake pedal of the service brake system is depressed until reaching a first threshold position different from a rest position, the first threshold position defined between 50% and 100% of a brake pedal stroke starting from rest position, and
    the control unit of the park brake system is configured to control a park brake pressure in the second pneumatic chamber at an intermediate pressure between 2 bars and 6.5 bars, wherein the park brake system is switched back from the assistance mode to the normal mode when the brake pedal is released until reaching a second threshold position lower than the first threshold position, including the park brake pressure being controlled to increase up to the park brake release pressure.

* * * * *